Patented Mar. 16, 1954

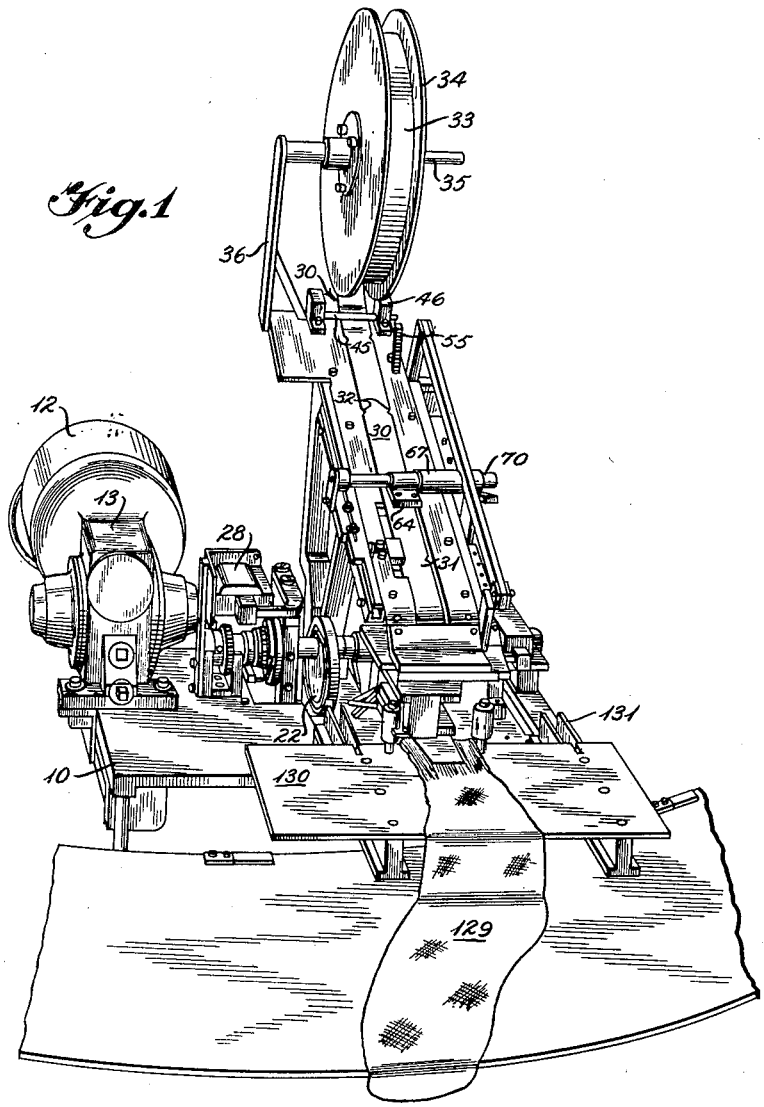

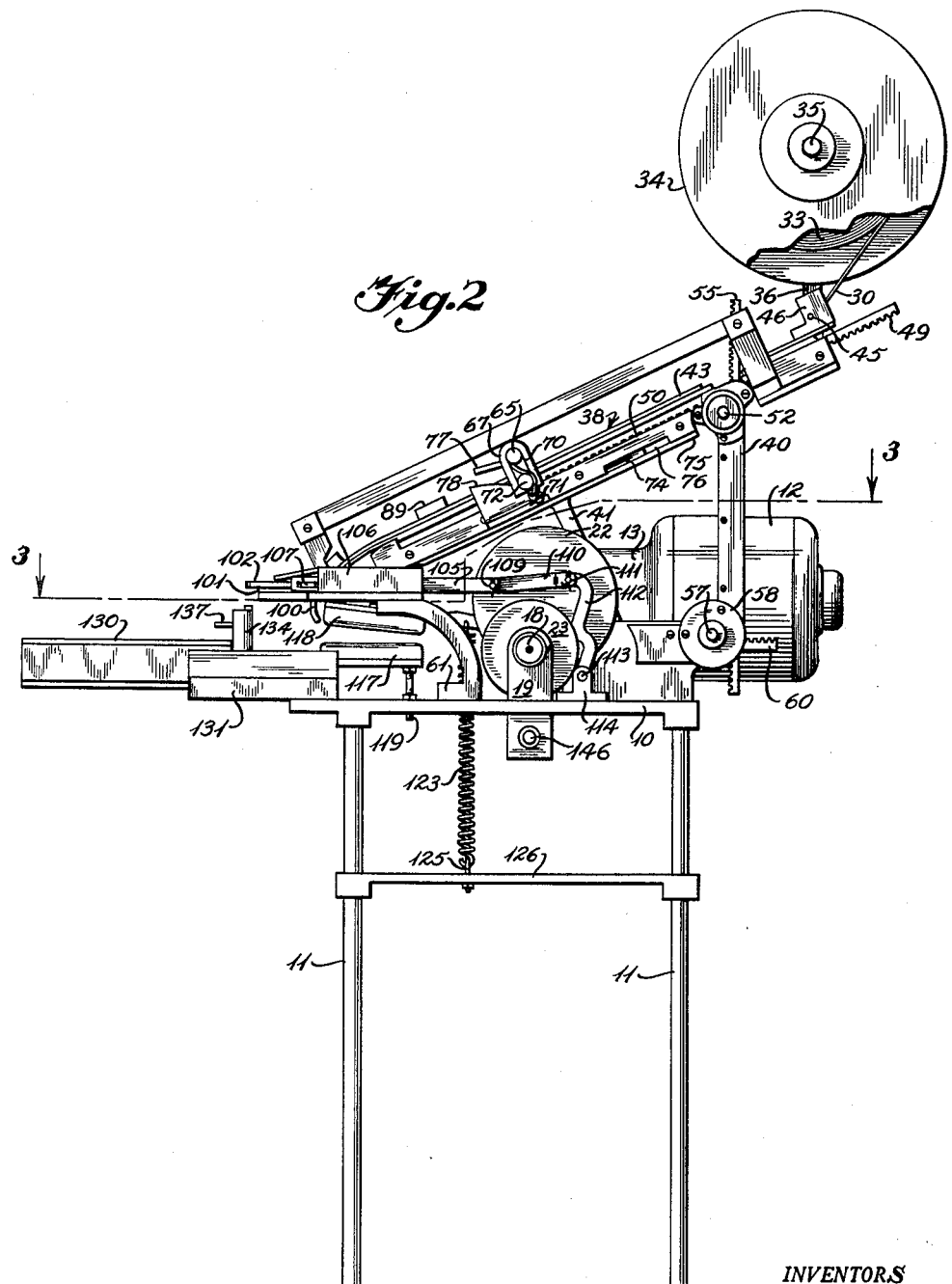

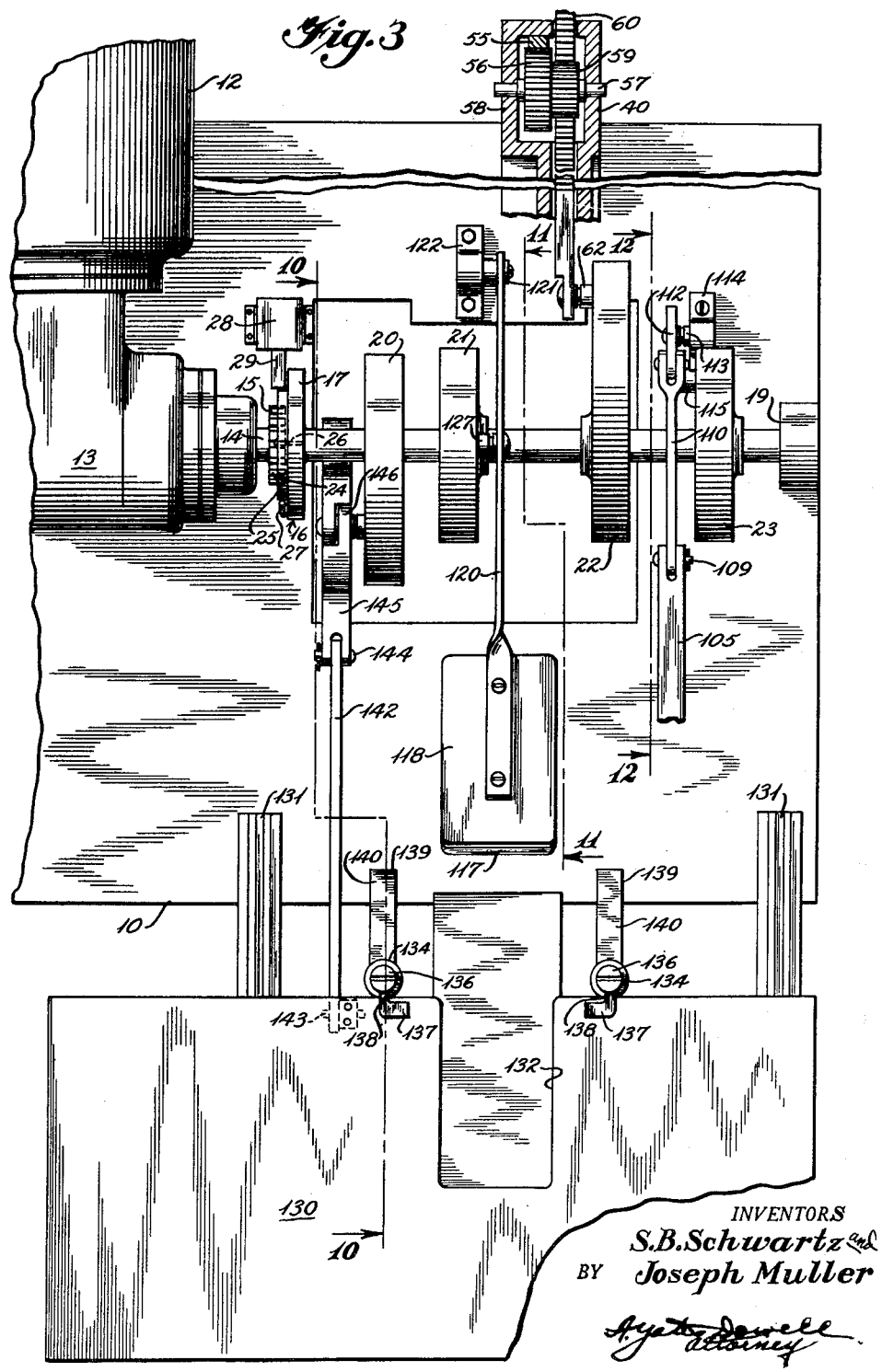

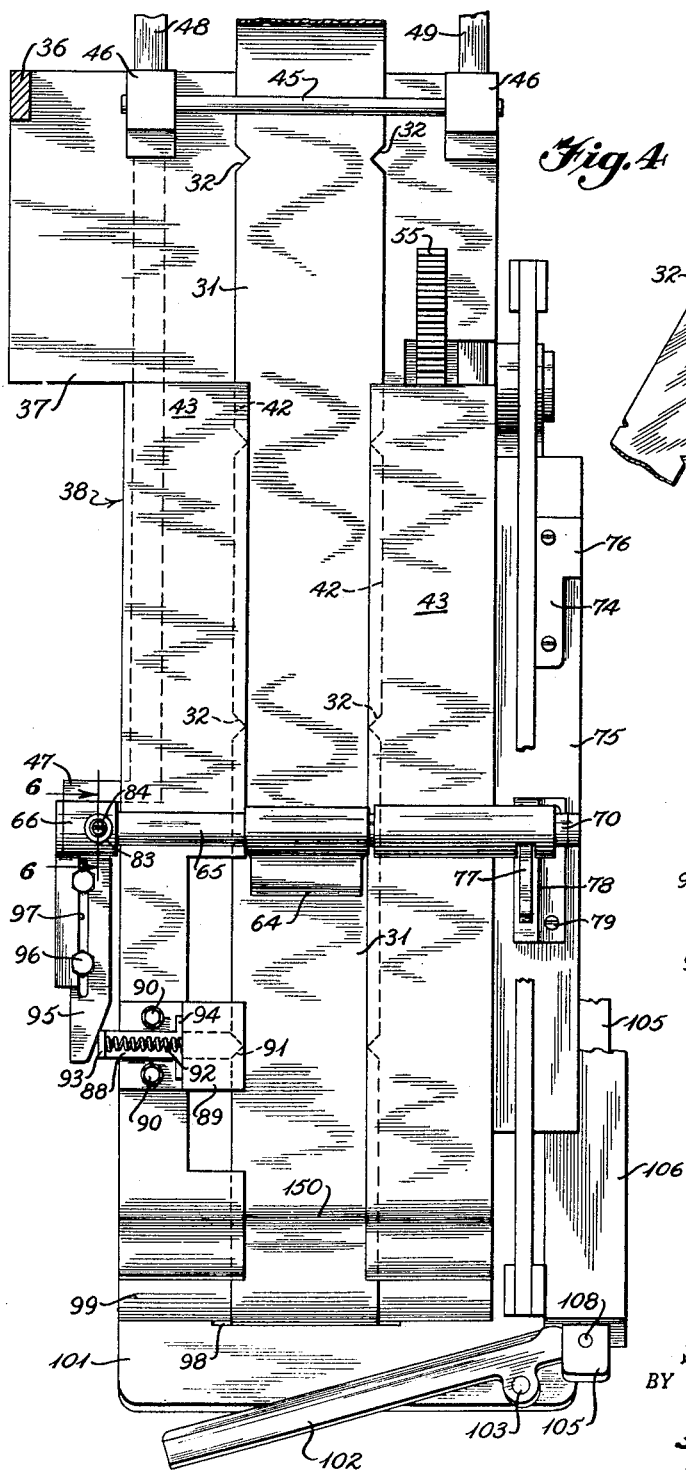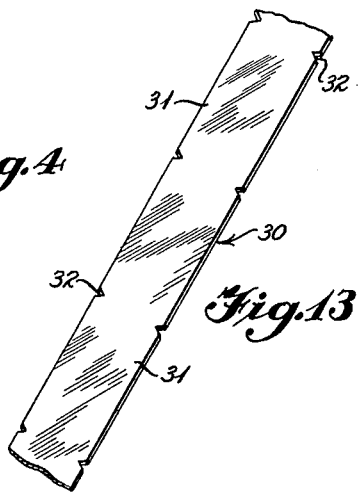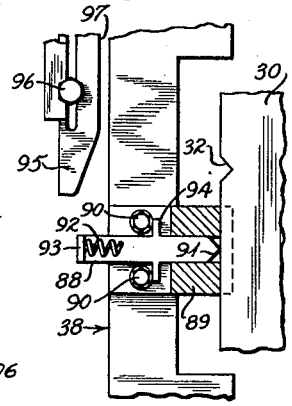
INVENTORS
S. B. Schwartz and
BY Joseph Muller March 16, 1954  S. B. SCHWARTZ ET AL  2,672,251
LABEL APPLYING MACHINE
Filed Feb. 5, 1952  7 Sheets-Sheet 5
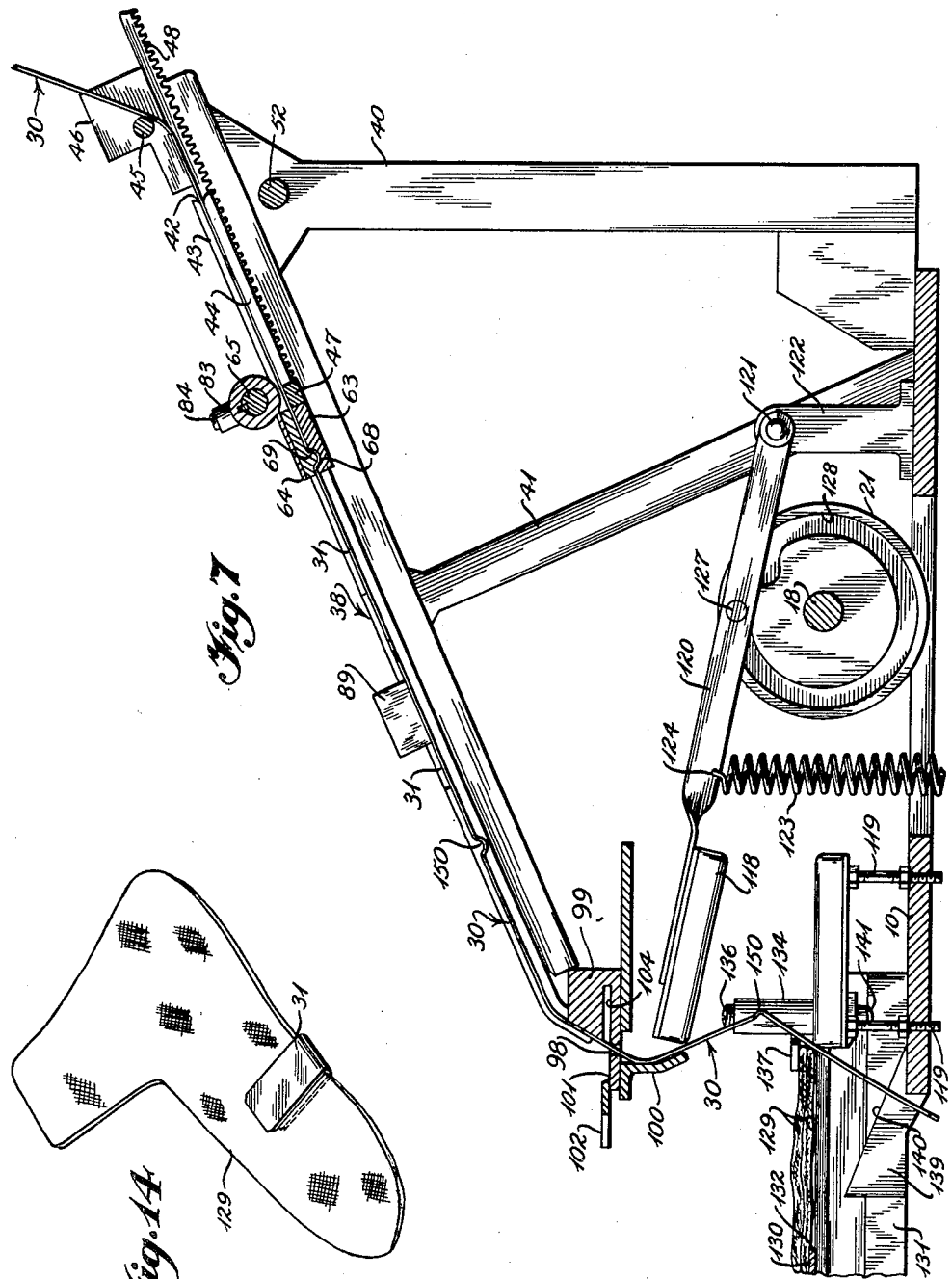
INVENTORS
S. B. Schwartz
BY Joseph Muller

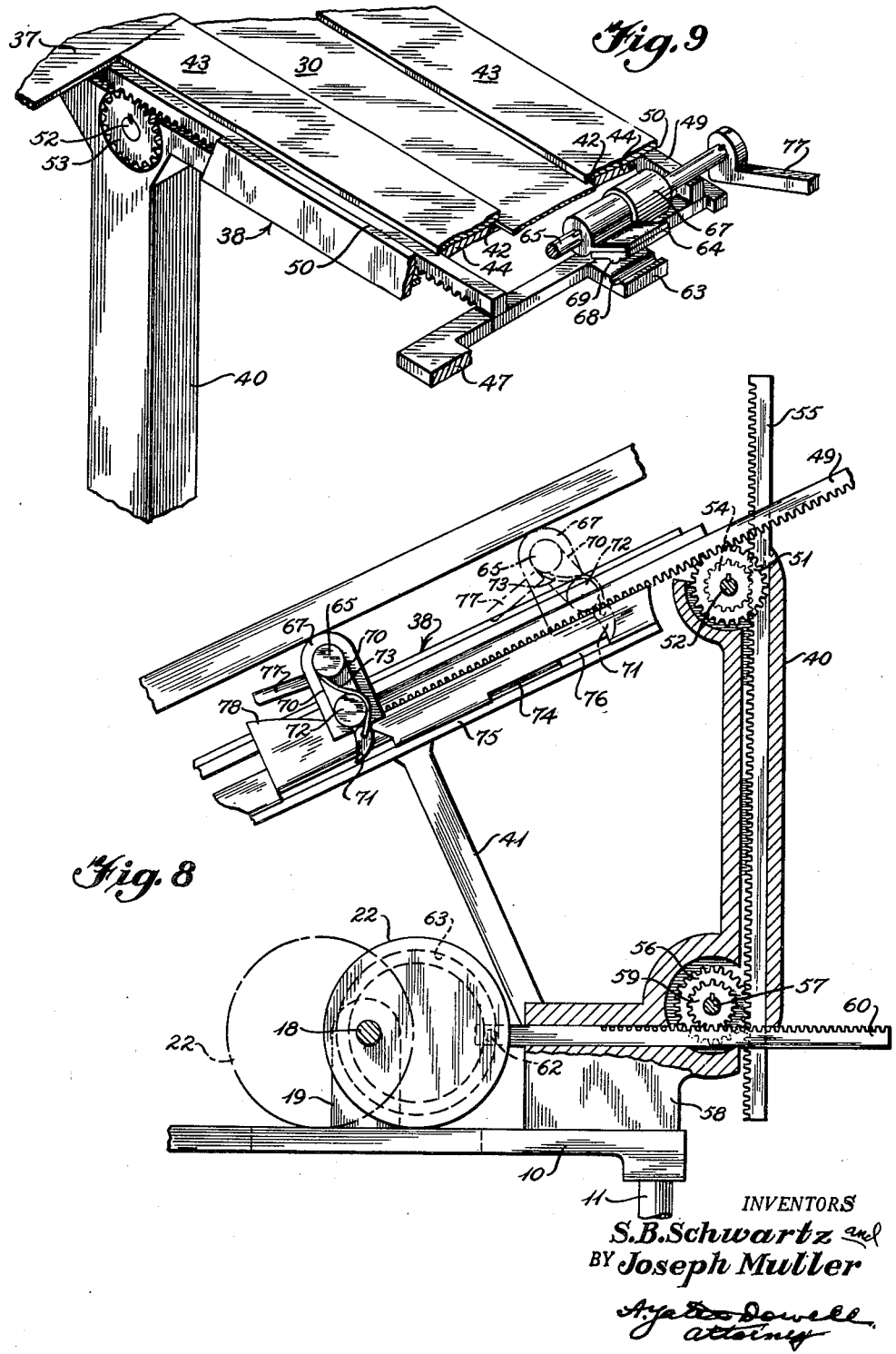

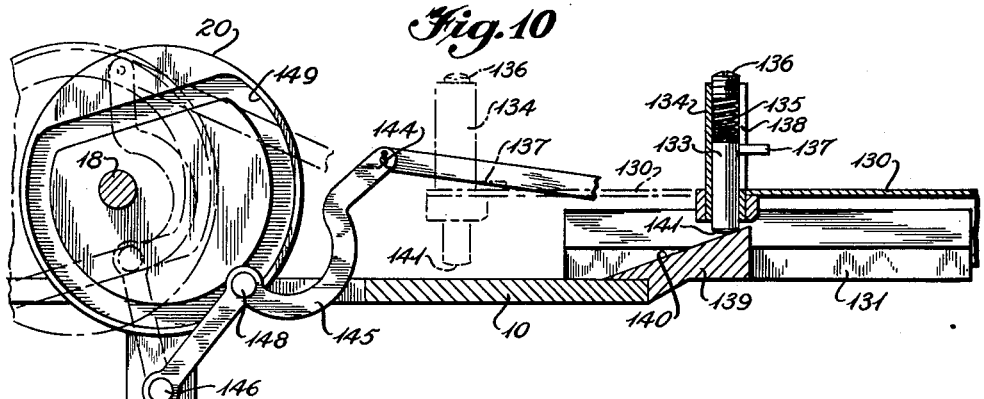
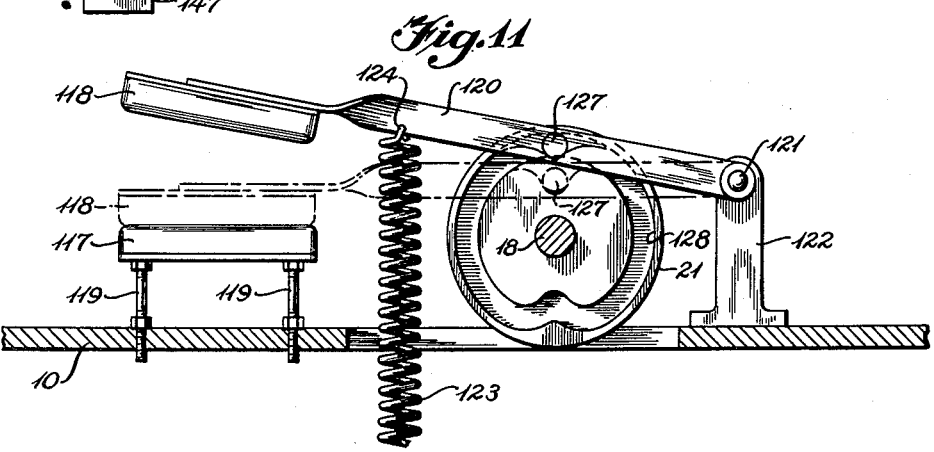
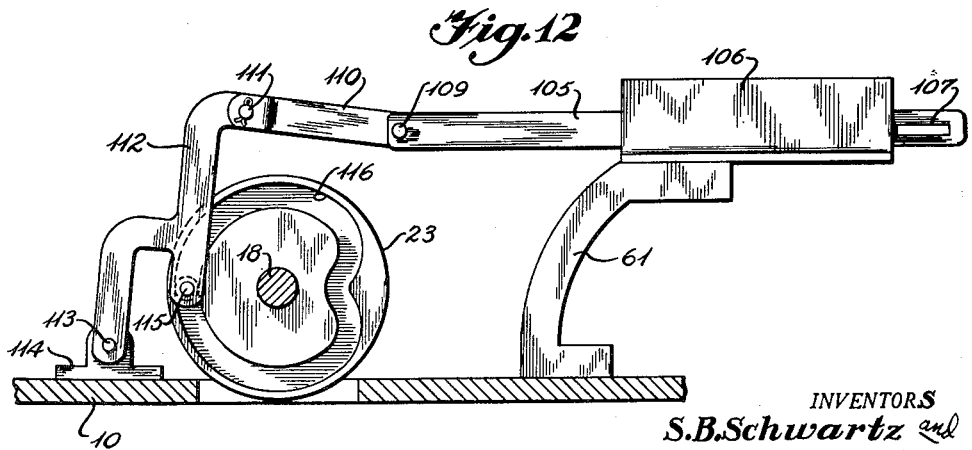
INVENTORS
S. B. Schwartz and
BY Joseph Muller

2,672,251

UNITED STATES PATENT OFFICE 2,672,251

LABEL APPLYING MACHINE

Shepard B. Schwartz and Joseph Muller, Nashville, Tenn., assignors to May Hosiery Mills, Nashville, Tenn., a corporation of Tennessee Application February 5, 1952, Serial No. 270,028

9 Claims. (Cl. 216—30)

This invention relates to manufacturing and more particularly to an apparatus for applying labels to manufactured fabric articles such as hosiery. While the invention will be described in connection with the application of labels to fabric articles such as hosiery it is to be understood that this is for illustrative purposes only and that the apparatus of this invention may well be utilized in applying labels to a wide variety of articles not necessarily of fabric materials.

In the hosiery industry it has been common practice to secure pairs of socks or other hose together by a label which is termed a rider. This rider is in the form of a strip which is doubled or folded about the superposed pair of socks at any desired location, the rider being secured to the material of the socks by a suitable adhesive. The rider is intended to carry any desired indicia to indicate the origin of the socks, the size, the material of which they may be made or any other desired information.

Heretofore in the hosiery industry the application of these riders has been almost universally a manual operation in which the gummed rider is grasped in the fingers of an operator, the gummed side thereof moistened and the rider applied to the pair of socks by the hands of the operator. Obviously such an operation even with highly skilled personnel is time consuming and materially contributes to the manufacturing costs of the article. As in all routine manual operations of this nature the work becomes very tedious and obviously as the work day progresses the efficiency of the operator will decrease and consequently an automatic apparatus which will perform this operation represents a valuable contribution to the industry.

Many machines have been developed and utilized to apply labels to many types of articles but prior to the present invention no successful apparatus has been proposed which will apply riders to fabric articles such as hosiery. Various problems arise in connection with this operation such as the compressibility and resiliency of the articles, the susceptibility to damage of the articles by catching on projections or pulling the threads thereof, the problem of securely attaching the riders to the articles as well as providing an apparatus of this nature which will be substantially foolproof in operation and which will require little maintenance with consequent loss of time in production.

It is therefore an object of this invention to provide an apparatus for applying riders to hosiery or similar articles entirely automatically and only with the necessity of an operator supplying the articles and removing them from the machine.

It is a further object of the invention to provide an apparatus for applying riders to hosiery or other similar articles which is entirely automatic in operation, which is relatively simple in construction and which may be made sufficiently rugged to withstand long periods of usage without the necessity for frequent shutdowns for maintenance, breakage or other reasons.

It is a further object of the invention to provide an apparatus for automatically applying riders to hosiery or other similar articles and in which the riders may be supplied from a relatively large roll and accurately registered in order that all riders will be applied in a similar manner.

It is a further object of the invention to provide an automatic apparatus for applying riders to hosiery or similar articles in which the apparatus is operated entirely from a single source of power and in which a single control serves to initiate operation of the apparatus, the remainder of the operation being entirely automatic.

It is a further object of the invention to provide an automatic rider applying apparatus for hosiery or similar articles which may be utilized as an individual machine or which may be conveniently combined with feeding means and additional machines in order to facilitate the labeling and packaging of such articles.

Further objects and advantages of the invention will be apparent from the following description taken in conjunction with the accompanying drawings, wherein:

Fig. 1 is a view in perspective showing the rider applying apparatus of this invention as viewed from the operator side of the machine;

Fig. 2, a side elevational view of the rider applying apparatus shown in Fig. 1;

Fig. 3, a fragmentary sectional view taken on the line 3—3 of Fig. 2 and showing the main operating parts of the apparatus;

Fig. 4, a fragmentary plan view showing the tape feeding means, the means for registering the tape and the means for cutting off individual riders;

Fig. 5, a fragmentary detail plan view showing the tape registration means;

Fig. 6, a sectional view taken on the line 6—6 of Fig. 4 and showing the detent control means for the tape feeding mechanism;

Fig. 7, a fragmentary side elevational view with parts in section for greater clarity and showing the manner in which the rider tape is fed and applied to the fabric articles;

Fig. 8, a fragmentary sectional view showing the drive means for the tape feed and the tape gripping and release means;

Fig. 9, a fragmentary view in perspective showing the tape gripping, feeding and releasing means;

Fig. 10, a sectional view taken on the line 10—10 of Fig. 3 and showing the drive means for the article feed table;

Fig. 11, a sectional view on the line 11—11 of Fig. 3 and showing the operating means for the rider applying irons;

Fig. 12, a sectional view taken on the line 12—12 of Fig. 3 and showing the operating mechanism for the rider cutoff knife;

Fig. 13, a view in perspective showing the riders as supplied in the form of a tape; and Fig. 14, a view in perspective showing a pair of socks with a rider applied thereto.

With continued reference to the drawings there is shown in Figs. 1 and 2 a rider applying apparatus constructed in accordance with this invention and having a base plate 10 which may be conveniently supported on upstanding legs 11. Obviously if desired the base 10 may be supported in any other convenient manner such as from the frame of an apparatus incorporating other machines for operating on the hosiery or other articles to which riders may be applied.

Mounted upon the base 10 and supported thereby is a drive motor 12 to which is attached a reduction gearing 13, the output shaft 14 of this reduction gearing serving to carry one element 15 of a one revolution clutch 16. Clutch 16 is provided with a driven member 17 which is secured to a transversely disposed cam shaft 18 rotatably supported on the plate 10 by suitable bearings 19. Cam shaft 18 has fixed thereto cams 20, 21, 22 and 23, the purpose and operation of which will be later described.

As best shown in Fig. 3 one revolution clutch 16 may be of more or less conventional construction, the driving member 15 having a series of teeth 24 in the periphery thereof and the driven member 17 carrying a pawl 25 pivotally mounted at 26 on the member 17. Pawl 25 is normally urged into engagement with the teeth 24 by a tension spring 27. The operation of clutch 16 is controlled by a solenoid 28 having a plunger 29 which when the solenoid 28 is deenergized projects and engages pawl 25 to hold the same out of engagement with the teeth 24. Upon the solenoid 28 being energized to retract the plunger 29, the spring 27 moves the pawl 25 into engagement with the teeth 24 and the driven member 17 is rotated thereby until the pawl 25 again engages the projected plunger 29 to disengage the pawl 25 from the teeth 24 thus interrupting the drive from driving member 15 to driven member 17.

In operation the solenoid 28 is energized to retract the plunger 29 and initiate operation of the cam shaft 18 and the solenoid 28 is immediately deenergized which causes the plunger 29 to project into the path of movement of the pawl 25 and disengage the same from teeth 24 of the driving member 15 upon completion of a single revolution of cam shaft 18. As stated above the structure of clutch 16 is conventional and has only been described in connection with this invention in order to give a full understanding of the structure and operation thereof. Suitable one revolution clutches of other design could be substituted for the clutch 16 with equally efficient operation of the apparatus.

As shown in Fig. 13 the riders which are applied by the apparatus of this invention are supplied in the form of a tape 30 each individual rider 31 being indicated by opposed notches 32 in the edges of the tape 30. The individual riders 31 are cut off at opposed notches 32 by a mechanism to be later described. One side of the tape 30 is coated with a thermoplastic adhesive and the opposite side of the tape may be printed or otherwise inscribed with suitable indicia to convey any information which is desired.

As shown in Fig. 2 tape 30 is provided in the form of a roll 33 which is carried by a reel 34 which in turn is supported on an axle 35 carried by a bracket 36 extending upwardly from a shelf 37 projecting from an inclined trackway 38. Trackway 38 is supported from the base plate 10 by spaced upstanding posts 40 and by spaced angularly disposed brace members 41. As best shown in Fig. 9 trackway 38 provides opposed grooves 42 for slidably receiving the edges of tape 30, grooves 42 being formed by upper plates 43 and by lower plates 44. As shown in Figs. 2 and 7 tape 30 extends from the reel 34 downwardly and under a guide roller 45 journalled in spaced brackets 46 and into the grooves 42, the tape 30 being fed downwardly through the grooves 42 in step by step movements as each individual rider 31 is cut therefrom and applied to the work in a manner to be later described.

The mechanism for feeding the tape 30 in step by step movements is best shown in Figs. 2, 4, 7, 8 and 9 and comprises a crosshead 47 extending transversely of the trackway 38 and slidably received in suitable guideways attached thereto. Crosshead 47 is reciprocated by spaced rack bars 48 and 49 slidably received in guideways 50 in track 38.

With particular reference to Fig. 8 rack bar 49 meshes with a pinion gear 51 which is attached to a shaft 52 journalled in the upper end of posts 40. Shaft 52 also carries another pinion gear 53 adjacent the opposite end thereof which meshes with rack bar 48. Shaft 52 is driven by a gear 54 attached thereto and meshing with a vertically slidable rack 55 received within one of the posts 40. Rack 55 in turn meshes with a gear 56 carried by a transversely disposed shaft 57 journalled in a bracket 58 attached to the baseplate 10, shaft 57 also carrying a pinion gear 59. Pinion gear 59 in turn meshes with a horizontally disposed reciprocating rack 60 which is slidably carried in bracket 58. With reference to Figs. 3 and 8 rack 60 carries adjacent its forward end a cam follower 62 which is disposed within a cam groove 63 in cam 22 carried by cam shaft 18.

As will be seen from an inspection of Figs. 3 and 8 upon rotation of cam shaft 18 and cam 22 rack 60 will rotate shaft 57 and thus reciprocate rack 55 which in turn rotates shaft 52 carrying gears 51 and 53 meshing with rack bars 49 and 48 respectively, reciprocation of these rack bars resulting in reciprocation of the crosshead 47.

The mechanism for feeding tape 30 as best shown in Figs. 4, 7, 8 and 9 comprises a fixed jaw 63 carried by the crosshead 47 and a movable jaw 64 for cooperating with the jaw 63, jaw 64 being carried by a shaft 65 journalled in spaced bearings 66 and 67 also carried by the crosshead 47. Clamping jaw 63 is provided with a groove 68 and movable clamping jaw 64 is provided with a projection 69 complementary to the groove 68 and mating therewith. As shown in Fig. 7 when the movable clamping jaw 64 is in closed position the projection 69 engages the tape 30 and forces the same into the groove 68 in jaw 63 thus firmly gripping the tape 30 to move the same and at the same time providing a crease the purpose of which will be later described.

Since the jaws 63 and 64 grip the tape 30 upon a downward movement of the crosshead 47 and release the same upon the return movement thereof mechanism is provided to effect movement of the jaw 64 into engagement with the tape 30 to clamp the same and this mechanism must of course operate in timed relation to the reciprocation of crosshead 47 and to the other elements of the apparatus. The mechanism for controlling operation of the clamping jaws 63 and 64 is best shown in Figs. 4, 7, 8 and 9 and comprises an arm 70 fixed to the end of shaft 65 adjacent the bearing 67. Arm 70 carries on the outer end thereof a pawl or dog 71 pivotally mounted at 72, dog 71 being normally urged in a clockwise direction as viewed in Fig. 8 by a spring or other equivalent resilient means 73 secured to the arm 70 and to the dog 71. A trip plate 74 is secured to an extending portion 75 of the trackway 38, trip plate 74 having a portion 76 disposed in the path of movement of the dog 71. As will be seen from an inspection of Fig. 8 upon movement toward the right as viewed in Fig. 8 the dog 71 will ride upwardly over the portion 76 of the trip plate 74 until the same occupies the position to the right of the portion 76. At this time spring 73 will urge the dog counterclockwise to a position where upon return movement of the crosshead 47 carrying arm 70 and dog 71 the lower portion of the dog will engage the upper edge of portion 76 of trip plate 74 and rotate shaft 65 and movable jaw 64 carried thereby in a counterclockwise direction as viewed in Fig. 8 to bring the jaw 64 and projection 69 into engagement with the tape 30 to securely clamp the same in place between the groove 68 of jaw 63 and the movable jaw 64. Further movement of the crosshead 47 toward the left will result in the dog 71 riding up over the portion 76 of trip plate 74, this movement being permitted by the spring 73 after which the crosshead and clamping jaws 63 and 64 move toward the left and feed the tape 30 downwardly within the grooves 42 in the trackway 38.

Upon reaching the extreme left hand point of travel as viewed in Fig. 8 the jaws 63 and 64 must be opened to release the tape 30 and this is accomplished by an arm 77 secured to the shaft 65 adjacent the bearing 67, arm 77 serving to engage a cam 78 in a form of an inclined wedge. Cam 78 is secured to the projecting portion 75 of the trackway 38 by screw threaded fastening means or the like 79. The solid line portion of Fig. 8 shows the arm 77 immediately after engaging the cam 78 at which time the movable clamping jaw 64 has been moved away from the fixed clamping jaw 63 to release the tape 30.

Since the jaws 63 and 64 must be maintained either in a clamping position or in an open position suitable mechanism has been provided in the form of a spring pressed detent 80 slidably received in a bore 81 in the bearing 66. The details of this structure are particularly shown in Fig. 6 and the detent 80 is urged inwardly by a compression spring 82 received within a boss 83 which is screw threaded to receive an adjusting screw 84. Detent 80 engages relatively flat surfaces 85 and 86 formed on the shaft 65 the peak 87 between these flat surfaces serving to move the detent 80 outwardly upon rotation of the shaft 65 and as will be clearly seen from an inspection of Fig. 6 detent 80 will act to retain the shaft 65 and movable clamping jaw 64 in either a closed or open position depending upon which direction the crosshead 47 is moving.

As mentioned above the tape 30 is provided with notches 32 in the longitudinal edges thereof and while these notches indicate the dividing line between adjacent riders 31, notches 32 also serve an additional function of permitting the accurate registration of the riders in order that they will be cut off at the appropriate place and accurately positioned for application to the work.

As shown in Figs. 4 and 5 the mechanism for accurately positioning and registering the riders 31 may comprise a movable plunger 88 slidably mounted in a block 89 secured to the trackway 38 by screw threaded fastening means or the like 90. Slidable member 88 is provided at its inner end with beveled portion 91 which is intended to mate with and register in the notch 32 in one edge of the tape 30. When in engagement with the notch 32 the beveled portion 91 serves to accurately locate the tape 30 and to prevent the movement thereof in either direction upon release of the clamping jaws 63 and 64 therefrom.

Slidable member 88 is normally held in retracted position by a compression spring 92 disposed between a shoulder 93 on the outer end of member 88 and a portion of the block 89. Movement of the member 88 in either direction may be limited by extending portions 94 which are adapted to engage stops formed by the fastening means 90. Slidable member 88 is urged inwardly into engagement with the notches 32 by a cam 95 which is adjustably secured to the crosshead 47 by screw threaded fastening means or the like 96 engaging through a slot 97 in the cam 95. Adjustment of the cam 95 by means of the screw threaded fastening means 96 permits the member 88 to be moved inwardly into engagement with the notches 32 upon the crosshead 47 reaching its lowermost position and simultaneously with engagement of the arm 77 with cam 78 to release the clamping jaws 63 and 64 from the tape 30.

As shown in Fig. 7 the tape 30 advances downwardly within the grooves 42 of trackway 38 and passes through an aperture 98 in a cutting block 99, the function and operation of which will be presently described. Located directly below the cutting block 99 is an inwardly directed guide member 100 which serves to engage the tape 30 after it has passed through aperture 98 and to direct the same into proper operative position.

Cutting block 99 is provided with an upper shearing surface 101 and positioned in engagement with this surface is a knife blade 102 which is pivotally mounted at 103 upon the block 99. Knife blade 102 normally occupies the position shown in Fig. 4 out of engagement with the tape 30 but upon the tape reaching a position with the slidable member 88 engaging in a notch 32, the knife blade 102 is actuated to swing inwardly about the pivot 103 and to shear the tape 30 at an appropriate location to sever a single rider 31 therefrom. During this movement of the knife blade 102, the same passes within a slot 104 provided within the block 99.

With particular reference to Figs. 3, 7 and 12 the operation of the knife blade 102 is accomplished by a bar 105 slidably received in a block 106 supported from a bracket 81 mounted on the base 10. Bar 105 is provided at its outer end with a slot 107 which serves to receive the outer end of knife blade 102 and if desired a pin 108 may be provided to link these two parts together. The opposite end of bar 105 is pivotally connected by a pin 109 with a connecting rod 110 which in turn is pivotally connected at 111 with a bell crank lever 112. Bell crank lever 112 is pivotally mounted at 113 on a bracket 114 supported on the base plate 10. Bell crank lever 112 also serves to carry a cam follower 115 which is received in a cam groove 116 of cam 23 carried by cam shaft 18. As will be seen from an inspection of Figs. 3, 4 and 12 upon rotation of the cam shaft 18 the cam 23 and cam groove 116 therein in engagement with the cam follower 115 will cause oscillation of the bell crank lever 112 about the pivot 113 which in turn will result in reciprocation of the bar 105, this movement in turn causing oscillation of the knife blade 102 to sever a rider 31 from the tape 30. Operation of the knife blade 102 is of course in timed relation to the operation of the other elements of the machine by reason of the fact that the operating cam 23 is carried by the cam shaft 18 which in turn actuates other cams controlling the movement of the remaining parts of the machine.

As stated above the tape 30 is provided on one side thereof with a thermoplastic adhesive coating which is heat sensitive and therefore must be applied to the fabric articles under the action of heat and pressure. For this purpose there has been conveniently provided in the apparatus of this invention a pair of heated irons 117 and 118, iron 117 being adjustably supported by bolts 119 on the base plate 10. As best shown in Figs. 3, 7 and 11 the movable iron 118 is carried by an arm 120 which is pivotally mounted at 121 on an upstanding bracket 122 secured to the base plate 10. Arm 120 and iron 118 is normally urged toward a position in engagement with the fixed iron 117 by a tension spring 123 which may be secured to the arm 120 at 124 and adjustably secured to a portion of the apparatus at 125. For this purpose a cross bar 126 may be secured to the legs 11 although any other suitable securing means may be provided. The adjustment at 125 permits varying the tension of spring 123 and therefore varying the pressure with which movable iron 118 engages the work supported by fixed iron 117.

Movable iron 118 is actuated by a cam follower 127 carried by arm 120, cam follower 127 engaging in a cam groove 128 in cam 21 carried by cam shaft 18. It is to be noted that cam groove 128 is provided with such a contour that movement of the arm 120 and iron 118 carried thereby is relatively rapid there being a long dwell in which there is no movement whatsoever of this arm. Consequently upon positioning of work upon the fixed iron 117 and upon rotation of the cam shaft 18 the arm 120 and movable iron 118 carried thereby will move into engagement with the rider 31 applied to the work and instantaneously press and heat this rider to securely fix the same to the article to which the rider is to be applied, likewise the iron 118 will move rapidly away from the work and consequently prevent scorching or burning thereof. Irons 117 and 118 may be electrically heated and thermostatically controlled in a manner well known in the art and consequently it is not considered necessary to provide any showing of the electrical connections or control circuit for these irons. In Fig. 11 the movable iron 118 is shown in inoperative position in full lines and in operative position in dotted lines.

As best shown in Figs. 2, 3 and 7 the socks 129 or other articles to which the rider 31 is to be applied may be conveniently placed upon a work table 130 which is slidably mounted for reciprocating movement toward and from the machine upon guideways 131 secured to the base plate 10. Work table 130 is provided in its forward edge at substantially the mid point thereof with a relatively wide notch 132 which serves to receive the irons 117 and 118 upon a forward movement of the table 130 to bring the socks or other articles 129 into operative position between the irons 117 and 118 to permit application of a rider 31 thereto.

As best shown in Fig. 10 work table 130 is provided with work clamping means in the form of vertically movable plungers 133 slidably received in upstanding tubular members 134 secured to the work table 130. Positioned within the tubular members 134 and engaging the upper ends of plungers 133 are compression springs 135, the compression of which may be adjusted by screw threaded plugs 136 received in the upper ends of tubular members 134. Plungers 133 are provided with arms 137 extending outwardly through slots 138 in the tubular members 134, these arms 137 as shown in Fig. 7 serving to engage the socks or other articles 129 to firmly clamp the same in place upon the upper surface of work table 130. With continued reference to Fig. 10 the plungers 133 and clamping arms 137 are actuated by cams 139 secured to the base plate 10, the upper inclined surface 140 of these cams serving to engage the lower end 141 of the plungers 133 upon reciprocating movement of the table 130 and as shown in Fig. 10 with the table 130 positioned outwardly in inoperative position, the inclined surface 140 of cams 139 engages the lower ends 141 of the plungers 133 and moves the same upwardly against the action of compression springs 135 thus releasing the clamping arms 137 and the socks or other articles 129 and permitting removal of the same and positioning of a second pair of socks to which a rider 31 is to be applied. Upon movement of the table inwardly to operative position as shown in dotted lines in Fig. 10 the ends 141 of plungers 133 slide down the inclined surface 140 of cams 139 and permit movement of the clamping arms 137 into engagement with the socks 129 or other articles under the action of the compression springs 135 to securely clamp these articles in position on the upper surface of table 130.

As best shown in Figs. 3 and 10 reciprocatory movement of the work table 130 is accomplished by a connecting rod 142 pivotally connected at 143 to work table 130, the opposite end of connecting rod 142 being pivotally connected at 144 to an arm 145 the opposite end 146 of which is pivotally connected to a bracket 147 secured to the base plate 10. Arm 145 serves to carry a cam follower 148 which is received in a cam groove 149 in cam 20 carried by cam shaft 18. Rotation of cam shaft 18 and cam 20 will cause oscillation of arm 145 about pivot 146 to move connecting rod 142 and table 130 connected thereto inwardly and outwardly and to position the socks 129 or other articles between the irons 117 and 118 to permit application of a rider 31 thereto. This reciprocating movement of the table 130 also clamps and releases the articles 129 by means of the clamping arms 137 in a manner as described above.

As shown in Fig. 7 the tape 30 is fed downwardly in the grooves 42 of the inclined trackway 38 by intermittent engagement of the clamping jaws 63 and 64 and the projection 69 in the movable jaw 64 pressing the tape 30 into the recess 68 in fixed jaw 63 results in forming a crease 150 in the tape 30, this crease serving as shown at the lower left hand side of Fig. 7 to place a bend in the tape 30 thus facilitating bending or folding of the rider 31 around the edges of the socks or other articles 129 when these articles are moved between the irons 117 and 118 by movement of the table 130 toward the right as viewed in Fig. 7. The folding of the rider 31 around the edges of the socks 129 or other articles results from crease 150 and the reaction of the outer surfaces of the rider 31 with the forward edges of the irons 117 and 118 when the edges of the socks 129 press against the rider during movement of table 130 toward the right as viewed in Fig. 7.

In operation assuming a roll of tape 33 to be supported by the reel 34 and the tape 30 to be fed downwardly through the grooves 42 of the inclined trackway 36 and the drive motor 12 to be operating, a pair of socks 129 or other articles are placed on the upper surface of work table 130 with the portion of the socks to receive the rider 31 disposed over the notch 132 in the table 130 and with a forward portion of the socks disposed beneath the clamping arms 137 on plungers 133. With the socks 129 in place the control means is actuated to energize the solenoid 28 and retract the plunger 29 thus tripping the clutch 16 and permitting the cam shaft 18 to make one complete revolution thus causing the following sequence of operation. Rotation of cam 20 causes the arm 145 carrying the cam follower 148 disposed in cam grooves 149 to oscillate about the pivot 146 thus moving the table 130 carrying the socks 129 inwardly to bring the forward edges of these socks into engagement with the rider 31 which has been detached from the tape 30 by action of the knife 102 which was actuated by the rotation of the cam 23 and oscillation of the bell crank lever 112 which through bar 105 oscillates the knife 102 to perform the cutting action. Further inward movement of the table 130 causes the socks to fold the rider 31 about the forward edge of the same this folding being facilitated by the crease 150 and by engagement of the rider with the forward edges of irons 117 and 118. Upon disposition of the socks 129 with the rider folded thereabout between the irons 117 and 118 rotation of cam 21 engaging cam follower 127 carried by the arm 120 will result in moving the iron 118 into engagement with the upper surface of the rider folded about the socks and pressing of the rider and socks between the irons 117 and 118. Since these irons are in a heated condition the thermoplastic adhesive applied to the inner surfaces of the rider 31 will be activated to firmly attach the rider 31 to the socks 129. Continued rotation of the cams 21 and 20 will result in the movable iron 118 being moved upwardly away from the rider 31 and retraction of the table 130 to move the socks 129 and rider 31 carried thereby to a position where the socks may be removed from the table, the clamping arms 137 being released by engagement of the plungers 133 with cams 140 which raise the plungers upwardly and release the clamping arms 137.

During retracting movement of the table 130 the cam 22 operates to move the rack 60 and through the associated racks and pinions to reciprocate the crosshead 47 carried by the inclined trackway 36, movable jaw 64 closing to clamp the tape 30 therebetween and advance the same to bring a new rider 31 into position. The operation of the clamping jaw 64 is fully explained above and further explanation is not considered necessary. Upon completion of one revolution of the cam shaft 18 the clutch 16 is disengaged and the apparatus comes to rest. As will be noted from the above explanation one revolution of the cam shaft 18 is all that is necessary to complete the application of a single rider to a pair of socks or other articles and to advance the tape 30 to bring a new rider into a position for application to the next pair of socks. While normally it is intended that the socks 129 will be manually positioned on the table 130 and removed therefrom, obviously if desired automatic conveying means could be provided which would operate in timed relation to the rider applying apparatus to feed such socks into position and to remove them therefrom.

It will be seen that by the above described invention there has been provided an efficient compact machine for applying labels in the form of riders to socks or other articles, the apparatus operating from a single source and being controlled by a single electric switch which may be automatically actuated in timed relation with other apparatus or which may be manually actuated to perform simply the rider applying operation. It is susceptible of being fabricated from readily available parts and materials and may be so constructed as to preclude frequent breakdowns and the necessity for extensive maintenance thus materially contributing to the efficient and low cost application of riders to hosiery or other articles.

It will be obvious to those skilled in the art that various changes may be made in the invention without departing from the spirit and the scope thereof and therefore the invention is not limited by that which is shown in the drawings and described in the specification but only as indicated in the appended claims.

What is claimed is:

1. Apparatus for applying labels having a thermoplastic coating to articles comprising a base, a drive motor mounted on said base, a cam shaft rotatably supported on said base, a clutch connecting said cam shaft and said motor, a trackway disposed above said base, labels in the form of a roll of tape supported adjacent said trackway, means on said trackway for slidably receiving said tape, feeding means for said tape comprising a crosshead slidably mounted on said trackway for reciprocating movement longitudinally thereof, a fixed clamping jaw carried by said crosshead beneath said tape, a movable clamping jaw pivotally mounted on said crosshead above said tape and cooperating with said fixed jaw to clamp said tape therebetween, means for engaging and disengaging said clamping jaws and operable upon reciprocating movement of said crosshead to grip and release said tape, a knife blade disposed adjacent the exit end of said trackway, means including a cam on said cam shaft for operating said blade to sever individual labels from said tape, a fixed heated iron mounted on said base, a movable heated iron carried by an arm pivotally mounted on said base, and a cam on said cam shaft for controlling the movement of said movable iron, a work table reciprocally mounted on said base for movement toward and away from said fixed iron, a notch in the leading edge of said table in alignment with said fixed iron, means including a cam on said cam shaft to reciprocate said table and means adjacent the exit end of said trackway for positioning a label in front of articles disposed on said table whereby upon forward movement of said table said label will be folded about the edges of said articles and said irons will engage said label and activate said thermoplastic coating to secure said label to said articles.

2. Apparatus for applying labels having a thermoplastic coating to articles comprising a base, a drive motor mounted on said base, a cam shaft rotatably supported on said base, a clutch connecting said cam shaft and said motor, a trackway disposed above said base, labels in the form of a roll of tape supported adjacent said trackway, means on said trackway for slidably receiving said tape, feeding means for said tape comprising a crosshead slidably mounted on said trackway for reciprocating movement longitudinally thereof, a fixed clamping jaw carried by said crosshead beneath said tape, a movable clamping jaw pivotally mounted on said crosshead above said tape and cooperating with said fixed jaw to clamp said tape therebetween, drive means including a cam on said cam shaft for reciprocating said crosshead, means for engaging and disengaging said clamping jaws and operable upon reciprocating movement of said crosshead to grip and release said tape, a knife blade disposed adjacent the exit end of said trackway, means including a cam on said cam shaft for operating said blade to sever individual labels from said tape, a fixed heated iron mounted on said base, a movable heated iron for cooperating with said fixed iron and a cam on said cam shaft for controlling the movement of said movable iron, a work table mounted on said base for movement toward and away from said fixed iron, a notch in the leading edge of said table in alignment with said fixed iron, means including a cam on said cam shaft to move said table and means adjacent the exit end of said trackway for positioning a label in front of an article disposed on said table whereby upon forward movement of said table said label will be folded about the edge of said article and said irons will engage said label and activate said thermoplastic coating to secure said label to said article.

3. Apparatus for applying labels having a thermoplastic coating to articles comprising a base, a drive motor mounted on said base, a cam shaft rotatably supported on said base, a clutch connecting said cam shaft and said motor, a trackway disposed above said base, labels in the form of a roll of tape supported adjacent said trackway, means on said trackway for slidably receiving said tape, feeding means for said tape comprising a crosshead slidably mounted on said trackway for reciprocating movement longitudinally thereof, clamping jaws carried by said crosshead, drive means including a cam on said cam shaft for reciprocating said crosshead, means for engaging and disengaging said clamping jaws and operable upon reciprocating movement of said crosshead to grip and release said tape, a knife blade disposed adjacent the exit end of said trackway, means including a cam on said cam shaft for operating said blade to sever individual labels from said tape, a fixed heated iron mounted on said base, a movable heated iron for cooperating with said fixed iron and a cam on said cam shaft for controlling the movement of said movable iron, a work table mounted on said base for movement toward and away from said fixed iron, a notch in the leading edge of said table in alignment with said fixed iron, means including a cam on said cam shaft to move said table and means adjacent the exit end of said trackway for positioning a label in front of articles disposed on said table whereby upon forward movement of said table said label will be folded about the edges of said articles and said irons will engage said label and activate said thermoplastic coating to secure said label to said articles.

4. Apparatus for applying labels having a thermoplastic coating to articles comprising a base, a drive motor mounted on said base, a cam shaft rotatably supported on said base, a clutch connecting said cam shaft and said motor, a trackway disposed above said base, labels in the form of a roll of tape supported adjacent said trackway, means on said trackway for slidably receiving said tape, feeding means for said tape, drive means including a cam on said cam shaft for operating said feeding means, a knife blade disposed adjacent the exit end of said trackway, means including a cam on said cam shaft for operating said blade to sever individual labels from said tape, a fixed heated iron mounted on said base, a movable heated iron for cooperating with said fixed iron and a cam on said cam shaft for controlling the movement of said movable iron, a work table mounted on said base for movement toward and away from said fixed iron, a notch in the leading edge of said table in alignment with said fixed iron, means including a cam on said cam shaft to move said table and means adjacent the exit end of said trackway for positioning a label in front of articles disposed on said table whereby upon forward movement of said table said label will be folded about the edges of said articles and said irons will engage said label and activate said thermoplastic coating to secure said label to said article.

5. Apparatus for applying labels having a thermoplastic coating to articles comprising a base, a drive motor, a cam shaft rotatably supported on said base, a clutch connecting said cam shaft and said motor, a trackway disposed above said base, labels in the form of a roll of tape supported adjacent said trackway, means on said trackway for slidably receiving said tape, feeding means for said tape, drive means including a cam on said cam shaft for operating said feeding means, means disposed adjacent the exit end of said trackway to sever individual labels from said tape, a fixed heated iron mounted on said base, a movable heated iron for cooperating with said fixed iron and a cam on said cam shaft for controlling the movement of said movable iron, a work table mounted on said base for movement toward and away from said fixed iron, a notch in the leading edge of said table in alignment with said fixed iron, means including a cam on said cam shaft to move said table and means adjacent the exit end of said trackway for positioning a label in front of articles disposed on said table whereby upon forward movement of said table said label will be folded about the edges of said articles and said irons will engage said label and activate said thermoplastic coating to secure said label to said articles.

6. Apparatus for applying labels having a thermoplastic coating to articles comprising a base, a drive motor, a cam shaft rotatably supported on said base, means connecting said cam shaft and said motor, a trackway disposed above said base, means on said trackway for slidably receiving labels in the form of a tape, feeding means for said tape, drive means including a cam on said cam shaft for operating said feeding means, means disposed adjacent the exit end of said trackway to sever individual labels from said tape, a pair of cooperating heated irons movable toward and away from each other and a cam on said cam shaft for controlling the movement of said irons, a work table mounted on said base for movement toward and away from said irons, means including a cam on said cam shaft to move said table and means adjacent the exit end of said trackway for positioning a label in front of articles disposed on said table whereby upon forward movement of said table said label will be folded about the edges of said article and said irons will engage said label and activate said thermoplastic coating and secure said label to said articles.

7. Apparatus for applying labels having a thermoplastic coating to articles comprising a base, a trackway disposed above said base, means on said trackway for slidably receiving labels in the form of a tape, feeding means for said tape, drive means for said feeding means, means disposed adjacent the exit end of said trackway to sever individual labels from said tape, a pair of cooperating heated irons movable toward and away from each other and means for controlling the movement of said irons, a work table mounted on said base for movement toward and away from said irons, means to move said table and means adjacent the exit end of said trackway for positioning a label in front of articles disposed on said table whereby upon forward movement of said table said label will be folded about the edges of said articles and said irons will engage said label and activate said thermoplastic coating to secure said label to said articles.

8. Apparatus for applying labels having a thermoplastic coating to articles comprising a base, a trackway above said base, means on said trackway for slidably receiving labels in a strip, feeding means for said strip, drive means for said feeding means, means adjacent the exit end of said trackway for detaching labels from said strip, a table mounted on said base for reciprocatory movement, means for moving said table, means adjacent the exit end of said trackway for positioning the label in front of articles on said table, whereby, upon movement of said table, the label will be folded about the edges of said article, heating means in the path of said article and engageable with the label for pressing the label on the article while softening said thermoplastic coating to secure the label to the article.

9. Apparatus for applying labels having a thermoplastic coating to articles comprising a base, a trackway mounted on said base, means on said trackway for slidably receiving labels in a strip, feeding means for said strip, drive means for said feeding means, means adjacent the exit end of said trackway for detaching labels from said strip, a table mounted on said base for reciprocatory movement, means for moving said table, means adjacent the exit end of said trackway for positioning the label in the reciprocatory path of movement of articles on said table, whereby, upon movement of said table, the label will be folded about the edges of said article, heating means in the path of said article and engageable with the label for pressing the label on the article while softening said thermoplastic coating to secure the label to the article.

SHEPARD B. SCHWARTZ.
JOSEPH MULLER.

References Cited in the file of this patent

UNITED STATES PATENTS

| Number | Name | Date |
| --- | --- | --- |
| 1,454,889 | Gustafson | May 15, 1923 |
| 1,968,881 | Edwards | Aug. 7, 1934 |
| 2,050,457 | Ohlsen et al. | Aug. 11, 1936 |
| 2,064,658 | Grieb et al. | Dec. 15, 1936 |
| 2,108,546 | Ness | Feb. 15, 1938 |
| 2,191,535 | McNeill | Feb. 27, 1940 |
| 2,267,195 | Elliot | Dec. 23, 1941 |
| 2,523,389 | Oskow | Sept. 26, 1950 |
| 2,543,323 | Marsh | Feb. 27, 1951 |